United States Patent [19]

Ward et al.

[11] Patent Number: 4,718,190

[45] Date of Patent: Jan. 12, 1988

[54] ICE FISHING RIG

[75] Inventors: Mai Ward; Carmen Ward, both of Massey, Canada

[73] Assignee: 655063 Ontario Limited, Lively, Canada

[21] Appl. No.: 888,217

[22] Filed: Jul. 23, 1986

[51] Int. Cl.$^4$ ............................................. A01K 97/12
[52] U.S. Cl. ........................................................ 43/17
[58] Field of Search ..................................... 43/17, 16

[56] References Cited

U.S. PATENT DOCUMENTS

| | | | |
|---|---|---|---|
| 1,870,782 | 8/1932 | Minutilli | 43/16 |
| 2,811,802 | 11/1957 | Schmidt | 43/17 |
| 2,897,622 | 8/1959 | Belke | 43/17 |
| 2,934,849 | 5/1960 | Kampa | 43/17 |
| 3,879,880 | 4/1975 | Bailey | 43/17 |
| 3,888,035 | 6/1975 | Totten | 43/17 |
| 4,021,958 | 5/1977 | Snodie | 43/17 |
| 4,043,070 | 8/1977 | Lamothe | 43/17 |
| 4,270,297 | 6/1981 | Yates | 43/17 |
| 4,471,554 | 9/1984 | Heiskell | 43/17 |
| 4,616,437 | 10/1986 | Harvey | 43/17 |

*Primary Examiner*—Gene P. Crosby

[57] ABSTRACT

The present invention provides an ice fishing rig comprising a rotatable reel, an electrical alarm device, a battery for operating the alarm device and a support stand for the reel, alarm device and battery. An electrical circuit is formed from the battery through the support stand and reel to the alarm device, and includes a circuit breaker located in a reel set-up position away from which the reel rotates for closing the circuit and activating the alarm to indicate the presence of a fish.

8 Claims, 5 Drawing Figures

ICE FISHING RIG

FIELD OF THE INVENTION

The present invention relates to an ice fishing rig having a rotatable reel used to activate an electrical alarm for indicating the presence of a fish on the line.

BACKGROUND OF THE INVENTION

There are presently available different types of alarm or signaling devices used for ice fishing to indicate when a fish has been caught. The most commonly used signal is a tip-up flag which is normally in a hidden down position and which pops up to a signaling position when a fish is caught on the line. Such an arrangement is found in U.S. Pat. No. 4,270,297 issued June 2, 1981 to Yates.

The Yates patent further describes the tip-up flag releasing a trigger switch to operate an electric lamp visible in the dark for night fishing.

Arrangements such as that described by Yates require rather complicated set-ups and are not usuable as stated by Yates with a conventional rod and reel, fimilar and acceptable to most fishermen.

SUMMARY OF THE PRESENT INVENTION

The present invention provides an ice fishing rig which takes advantage of standard construction techniques and which is acceptable to the everyday fisherman. More particularly, the present invention provides an ice fishing rig comprising a rotatable reel around which the fishing line is wound and lowered into the water, an electrical alarm device, a battery for operating the alarm device and a support stand for the reel, alarm device and battery. An electrical circuit is formed from the battery through the support stand and reel with circuit breaking means being provided and located in a reel set-up position away from which the reel rotates for closing the circuit and activating the alarm to indicate the presence of a fish on the line.

BRIEF DISCUSSION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
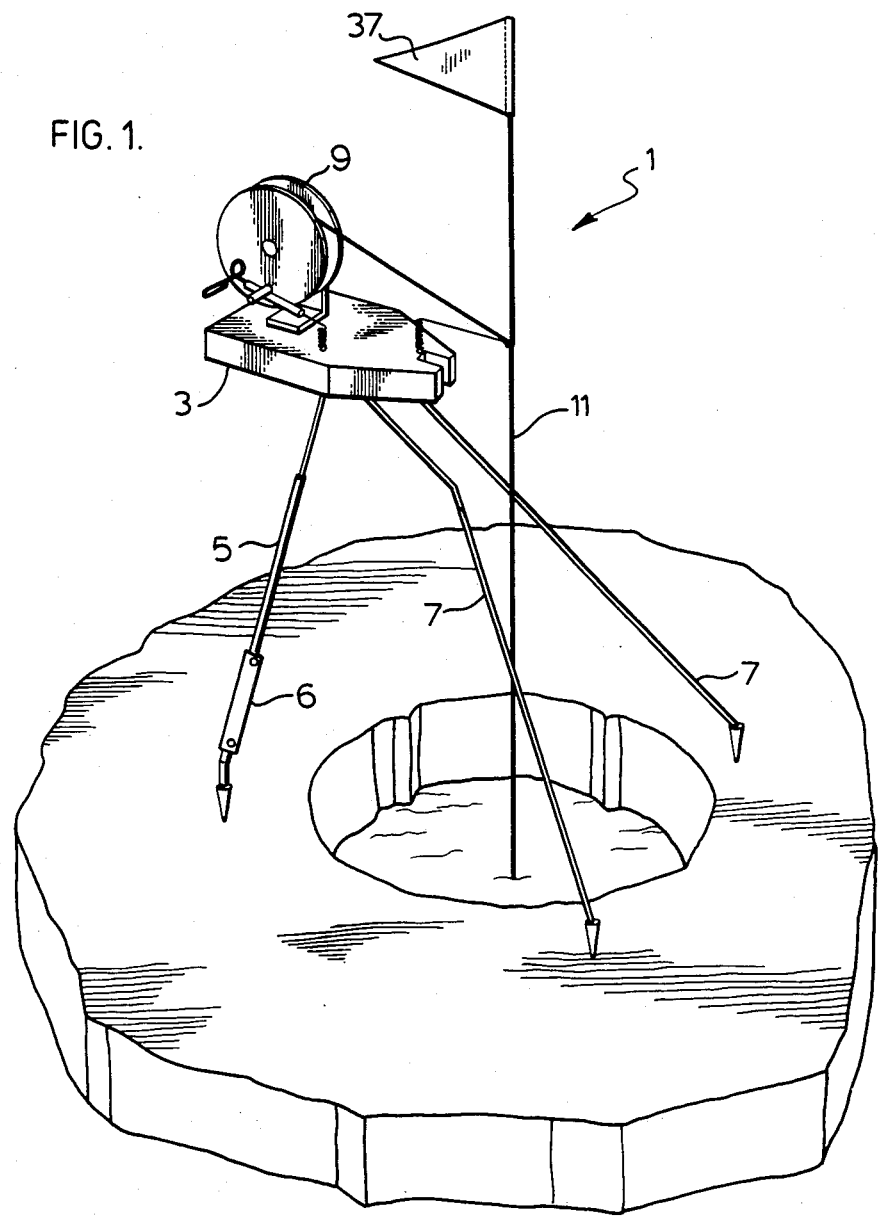
FIG. 1 is a perspective view of an ice fishing rig according to a preferred embodiment of the present invention.

FIG. 1 shows an ice fishing rig generally indicated at 1 which is set up over a hole formed in the ice with line 11 extending down through the hole into the water below the ice surface.

The support for the fishing rig comprises a main plate 3 with a first leg 5 extending down to the rear of the plate and a pair of forward legs 7. In the arrangement shown leg 5 is telescopically height adjustable according to the surface on which the rig is supported. If required, the forward legs may also be made height adjustable and all of the legs are inwardly collapsible where connected to plate 3 to fold against one another in a storage position. Again in the particular arrangement shown leg 5 is provided with a storage strap 6 used for wrapping the legs when folded against one another in the storage position.

Each of the legs is provided with a pick-like foot for preventing shifting of the rig on the icy surface. In a further preferred embodiment the rear leg, which comprises a telescopic two piece tubular construction, may be provided with an enlarged nylon foot in lieu of the pick which acts as a stopper for preventing the two leg pieces from separating from one another.

A rotatable reel 9 around which line 11 is wound is supported atop the main plate by a bracket 13. This bracket includes an axil or shaft portion 15 which extends centrally through to support and permit rotation of reel 9. Provided to one side of the reel is a handle 10 which is used to manually rotate the reel.

The main feature of the present invention resides in the rotation of the reel for operating an electrical alarm signal indicating the presence of a fish hooked on line 11.

More particularly the reel forms part of an electrical circuit which further includes an electrical alarm device 17 such as a buzzer or the like, a battery 19 for operation of alarm device 17, and a spring member 21. It will be clearly seen in FIG. 2 where battery 19 is connected directly to bracket 13 which is electrically conductive for passing current through shaft 15 to reel 9. Spring member 21 which is electrically connected to buzzer 17 includes an insulated portion 23 and an electrically conductive portion 25. Handle 10 on the reel is itself electrically conductive and is electrically connected to shaft 15 to act as a contact within the electrical circuit as described above.

In the set-up position, after line 11 has been fed down through the hole in the ice the reel handle fits against insulated portion 23 of spring 21 for inhibiting but not preventing any further movement of the handle, although it does prevent substantially free rotation of the reel so the line carrying any weights or lures does not continue to drop farther then described into the water. At this set-up position the insulated portion of spring 21 acts as a circuit breaker to open the electrical circuit from the battery through the bracket and reel to the buzzer so that the buzzer is inoperative.

Spring 21 is flexible to the extent that it only prevents free wheeling of the reel to stop undesired playout of the fishing line, but does not prevent rotation of the reel under the pull of a fish hooked onto the line. Therefore as soon as a fish is hooked this will cause the reel to rotate moving electrically conductive handle 10 off insulated portion 23 and onto the electrically conductive portion 25 of spring 21. This closes the electrical circuit to allow current from battery 19 to flow up through bracket 13 to the reel and through the closed circuit contact at reel handle 10 and spring portion 25 to activate buzzer 17. Again it is to be noted that the spring itself will deflect downwardly allowing the reel handle to continue to rotate until it once again comes into contact with the spring providing an intermittent on/off signaling of the buzzer.

The use of an audible signal as described above has a number of benefits over conventional tip-up type signals. Firstly, the fishing rig does not have to be under constant surveillance because of the audible as opposed to the visual signal from the rig. Secondly, because the signal is audible it is equally as effective at night time as it is through the day light hours.

Figure 5:
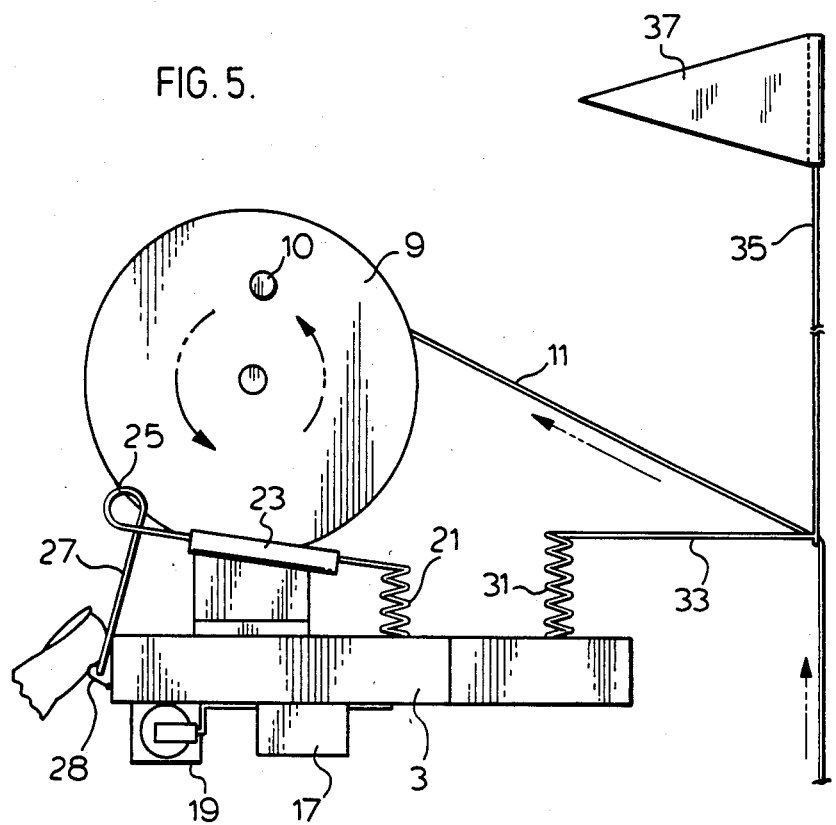

Once the fish has been hooked it is no longer necessary to operate the audible signal and accordingly spring member 21 is further provided with a manual release 27 which enables gripping of the spring to pull it down, out of the orbital path of the reel handle as seen in FIG. 5 of the drawings. Also provided is a catch 28 which hooks into the grip portion 27 of the spring to lock it in the FIG. 5 position out of the way of the reel handle and allowing free rotation of the reel when working with the fish on the line.

As a further preferred feature of the present invention the fishing rig is also provided with a visual indicating device operating in much the same manner as the tip-up flag but being much less complicated in its construction. More particularly the rig includes a brightly coloured flag 37 mounted on a spring steel arm comprising horizontal section 33 and upright section 35. The horizontal section of the arm is attached to the main plate through spring member 31 so that the flag assembly has built-in flexibility.

Figure 2:
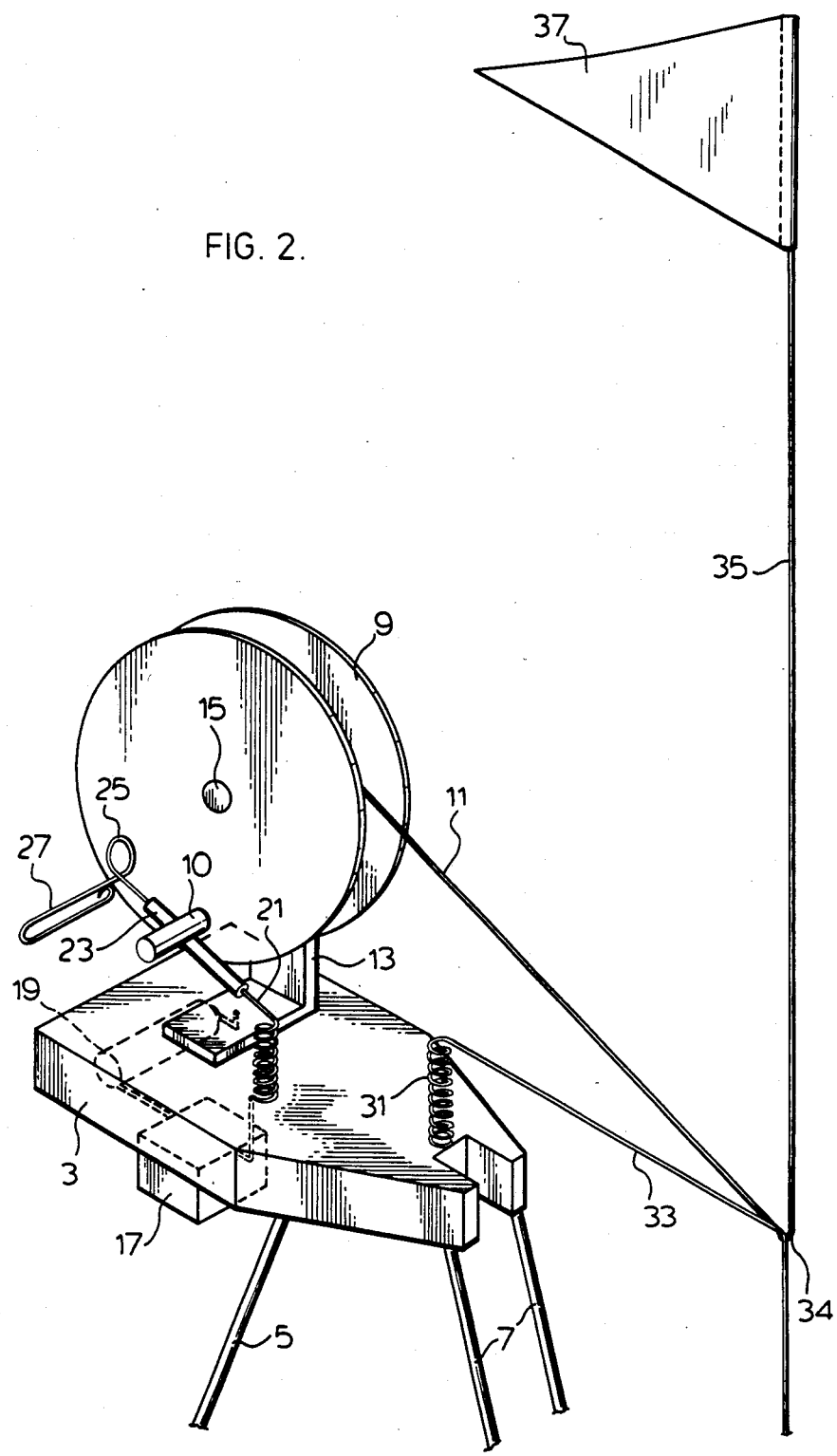
FIG. 2 is an enlarged perspective view of the reel region of the rig of FIG. 1.
Figure 3:
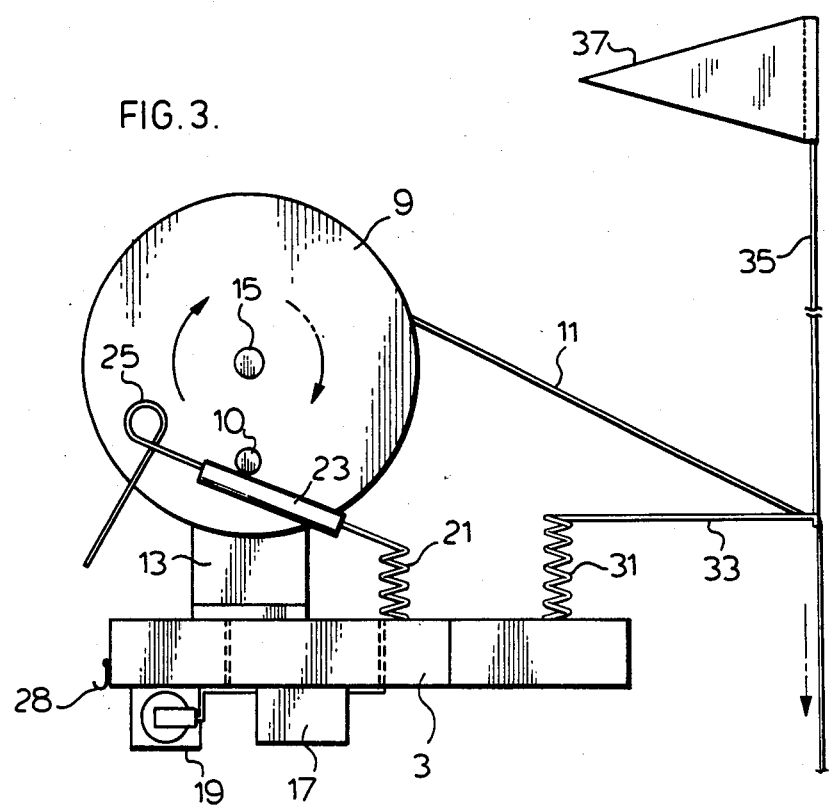
FIGS. 3, 4 and 5 are side views of the reel region showing operation of the reel.
Figure 4:
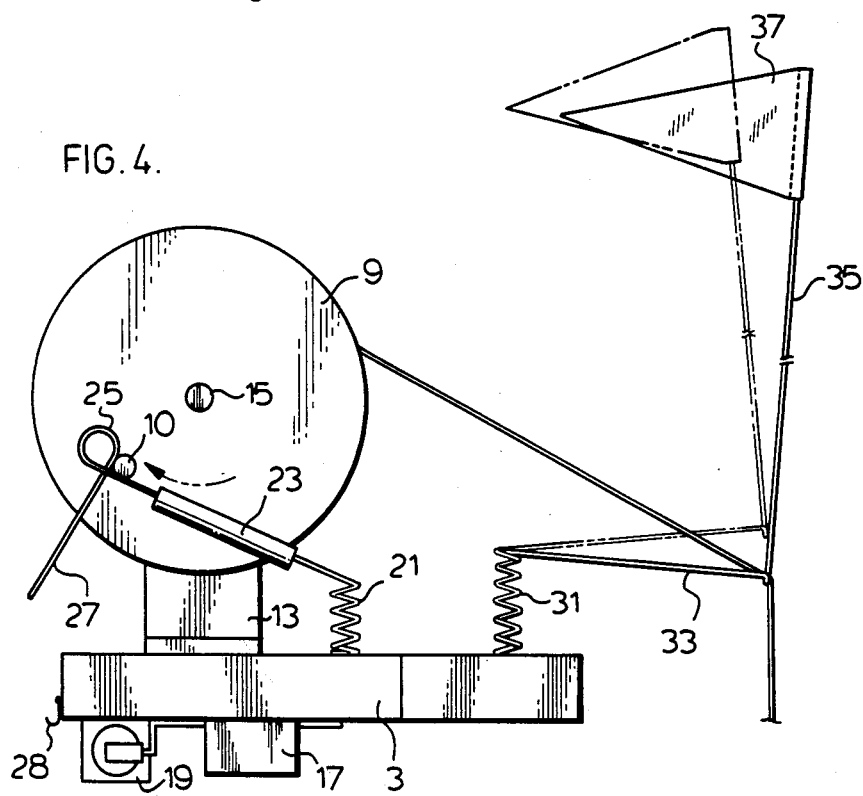

The fishing line from the reel runs over the flag support at the junction between the horizontal and vertical sections where the arm includes a small dish shaped region 34 best seen in FIG. 2 for trapping the line. When a fish bites and runs with the line it pulls the flag downwardly as shown in FIG. 4 with the natural flexibility of the arm support causing an up and down bobbing of the flag to provide a readily visible signal that the fish has been caught.

It will now be seen from the above that the fishing rig of the present invention while being relatively simple in construction and using many standard reel and line components is extremely efficient in its operation. Furthermore, although various preferred embodiments of the invention have been described herein in detail it will be appreciated by those skilled in the art that variations may be made thereto without departing from the spirit of the invention or the scope of the appended claims.

The embodiments of the invention in which an exclusive property or privilege claimed are defined as follows:

1. An ice fishing rig comprising a rotatable reel, an electrical alarm device, a battery for operation of said alarm device, and a support stand for said reel, alarm device and battery with an electrical circuit being formed from said battery through said support stand and reel to said alarm device, and circuit breaking means located in a preset reel set-up position and means for activating said circuit through said reel when said reel rotates for closing said circuit and activating said alarm device.

2. An ice fishing rig as claimed in claim 1 including an electrically conductive handle on said reel and a spring for inhibiting movement of said handle and preventing free rotation of said reel, said spring forming part of said electrical circuit and having an insulated portion against which said handle of said reel rests when in the set-up position and having an electrically conductive portion against which said handle moves with rotation of said reel to close said circuit.

3. An ice fishing rig as claimed in claim 2 wherein said alarm device comprises an audible alarm which operates intermittently with rotation of said reel causing said handle to orbit to and away from said electrically conductive portion of said spring member.

4. An ice fishing rig as claimed in claim 2 including a grip region on said spring member for manually moving said spring member out of the way of said handle to enable free rotation of said reel.

5. An ice fishing rig as claimed in claim 2 wherein said reel is mounted by an electrically conductive upright bracket to said support stand with said bracket forming part of said electrical circuit.

6. An ice fishing rig as claim in claim 1 further including a mechanical alarm device.

7. An ice fishing rig as claimed in claim 6 wherein said electrical alarm device comprises an audible alarm and wherein said mechanical alarm device comprises a visible signal member fitted to a flexible arm portion of said rig over which a fishing line from said reel passes for flexing said arm portion and moving said signal member as the fishing line is unwound from said reel.

8. An ice fishing rig as claimed in claim 1 wherein said support stand includes a plurality of support legs at least one of which is axially adjustable.

* * * * *